United States Patent Office 3,700,523
Patented Oct. 24, 1972

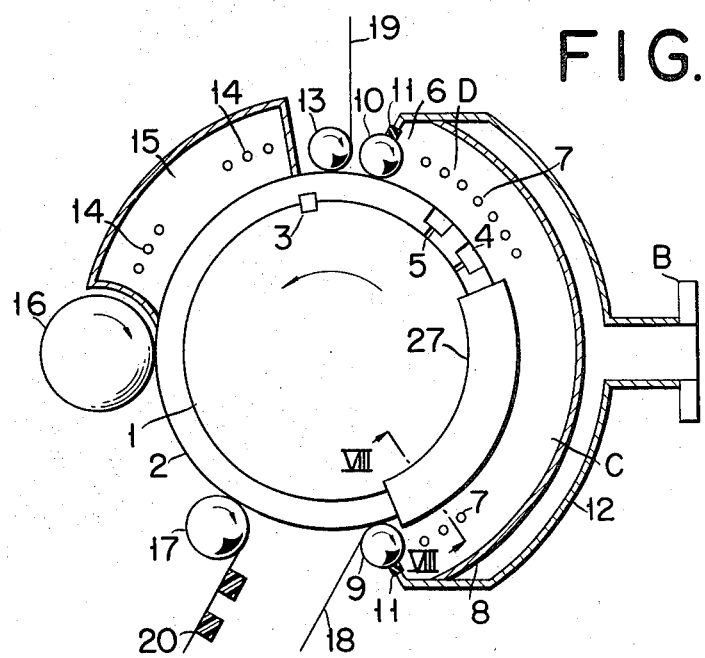
FIG. 7
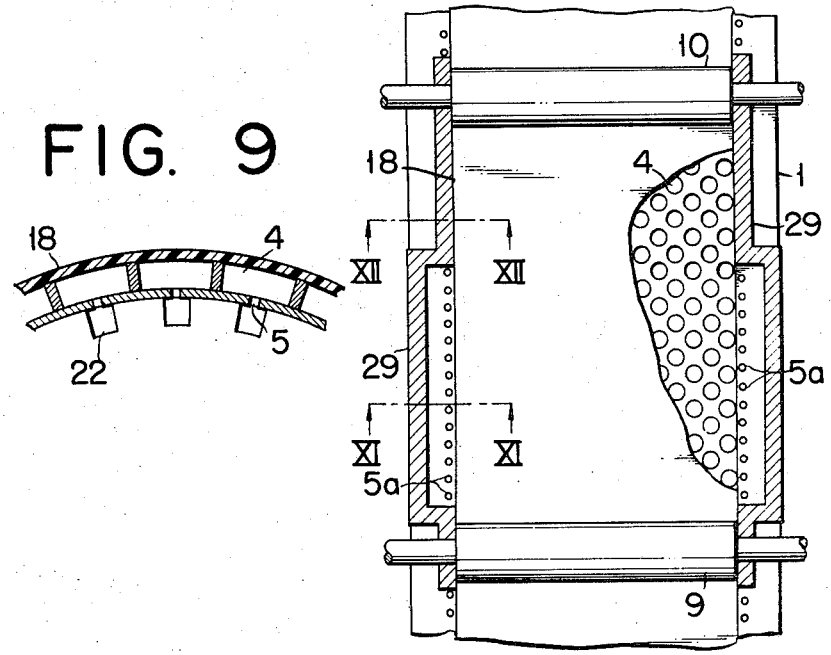
FIG. 9
FIG. 10

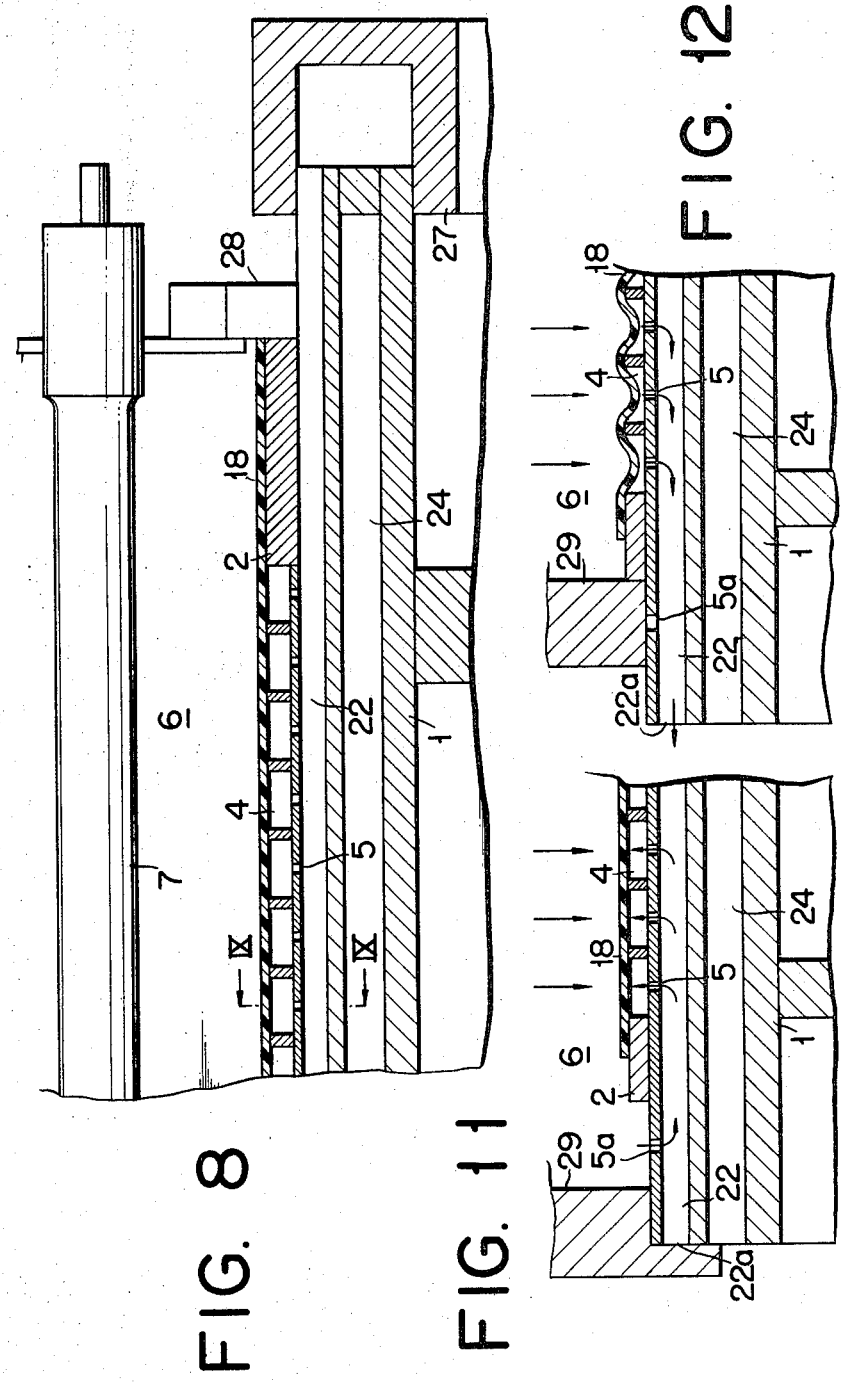

3,700,523
METHOD FOR MANUFACTURING PLASTIC CUSHIONING MATERIAL
Wasuke Sato, Kawasaki, Shigeyuki Hatakeyama and Masashi Koide, Yokohama, Sadao Yamamoto, Kawasaki, and Mitsumaro Fujisawa, Yokohama, Japan, assignors to Showa Denko K.K., Tokyo, Japan
Filed Jan. 30, 1970, Ser. No. 7,156
Claims priority, application Japan, Feb. 1, 1969, 44/7,049; Feb. 25, 1969, 44/13,582; Jan. 22, 1970, 45/5,491, 45/5,492
Int. Cl. B32b 3/30
U.S. Cl. 156—210      2 Claims

ABSTRACT OF THE DISCLOSURE

A method and apparatus for manufacturing plastics cushioning material which consists in feeding a first film made of thermoplastic material to the surface of a molding drum having a plurality of molding recesses formed therein, and air exhausting means communicating with said recesses and a cooling means disposed near the bottom of said recesses, heating said first film to a temperature over its softening point, pressing it for embossment with compressed air, feeding a second film similarly made of thermoplastic material to the surface of said molding drum to be attached to said first film in such a manner that said second film closes the openings of embossments formed on said first film, heating said second film to a temperature over its softening point, and integrally bonding both films by maintaining the temperature of both films at a higher level than their softening points, thereby hermetically sealing up the embossments of said first film.

---

The present invention relates to a method and apparatus for embossing a film of thermoplastic material and laminating another similar film thereto and more particularly to an improved method and apparatus for manufacturing cushioning material easily and efficiently with air or other gases sealed up in the interstice between the assembled resin films constituting said cushioning material.

Heretofore, plastics cushioning material has been manufactured either by working a film just as prepared by an extruder which is still in a molten state or thermally plasticizing an already formed film. However, the former process, for example, generally requires two types of film-forming equipment, that is, one for embossing a film and one for bonding another film with said embossed film. While a single line of equipment can produce a cushioning film assembly, it is necessary in this case to use a specially designed T-die. At any event, said former process has the drawbacks that it needs a bulky and complicated apparatus, resulting in high plant cost and troublesome operation.

The latter process of hot working an already formed film to manufacture cushioning material comprises the steps of heating a film and forming rows of embossments thereon (embossing step) and laminating another film to said embossed film (laminating step). This process is handicapped by the fact that upon heating, the film shrinks in a transverse direction to deteriorate the quality of product and also sometimes tends to be taken up on a heating roller, all of these difficulties obstructing industrial production.

Generally, embossment is carried out by molding a film with pressure using a male mold, or by vacuum suction.

The process of embossing a film with compressed gases using a female mold rotor has been deemed unsuitable due to the difficulties of preventing the leakage of said gases.

The present invention provides a method and apparatus for manufacturing cushioning material free from the aforementioned shortcomings which, for easy and efficient fabrication of said material, comprises employing a female mold rotating drum, substantially embossing a first film with compressed air and laminating a second film with said first embossed film. The method of the present invention comprises the steps of feeding a first film to the surface of a molding drum having a plurality of molding recesses formed thereon, an air exhausting means communicating with said recesses and a cooling means disposed near the bottoms of said recesses, heating said first film to a temperature over its softening point, and embossing it with compressed air, feeding a second film made of thermoplastic material to the surface of said molding drum to be attached to said first embossed film, heating said second film to a temperature over its softening point, integrally bonding both films by maintaining the temperature of both films at a higher level than their softening points in such a manner that said second film closes the openings of embossments formed on said first film, therby hermetically sealing the embossments of said first film, cooling said bonded film assembly while being supported on said molding drum and thereafter removing it therefrom.

This invention can be more fully understood from the following detailed description when taken in connection with reference to the accompanying drawings, in which:

FIGS. 5 to 7 are respectively cross sectional views of said apparatus according to other embodiments of the invention;

FIG. 8 is a fractional sectional view on line VIII—VIII of the apparatus of FIG. 7;

FIG. 9 is a fractional sectional view on line IX—IX of the apparatus of FIG. 8;

FIG. 10 is a fractional developed view of said apparatus according to a further embodiment of the invention;

FIG. 11 is a fractional sectional view on line XI—XI of the apparatus of FIG. 10; and FIG. 12 is a fractional sectional view on line XII—XII of the apparatus of FIG. 10.

Figure 1:
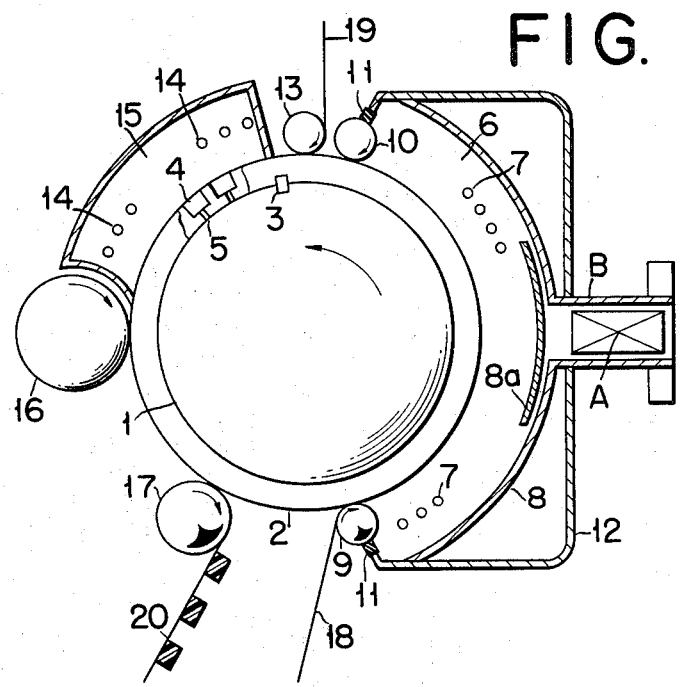
FIG. 1 is a cross sectional view of an apparatus for manufacturing plastics cushioning material according to an embodiment of the present invention.

There will now be described the method and apparatus of the present invention for manufacturing plastics cushioning material by reference to the embodiments illustrated in the appended drawings. Throughout the drawings, the same numerals denote the same parts. Referring to FIG. 1, there is detachably fitted an engaging ring 2 made of, for example, metal to the outer periphery of the body of a molding rotating drum 1, the interior of which is cooled with water, said ring 2 being fixed to the body of said drum 2 by means of a key 3.

The detachable engaging ring 2 has the advantage of being easily replaced by another one matching the desired shape and size of embossments. Further, said ring 2 may consist of a suitable belt. On the outer surface of said ring 2 are spatially arranged recesses 4 for embossing a film as desired. Under the bottom of each recess 4 is vertically perforated a narrow air exhausting bore 5 which communicates with an air exhausting duct 22 (FIG. 3) provided in a manner to extend all around the outer surface of the drum body. This bore 5 and duct 22 jointly allow air present at a female molding recess to escape to the outside when the film is embossed by being pressed into said recess. The construction of aforementioned ring 2, air exhausting means and the cooling means of the drum 1 have such a construction as illustrated in FIG. 3.

Figure 3:
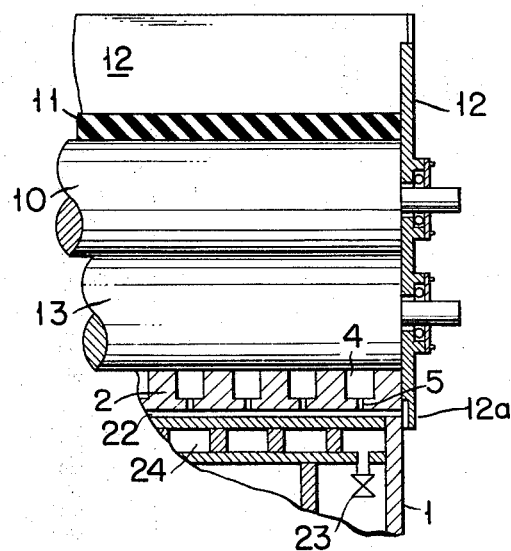
FIG. 3 is a fractional sectional view on line III—III of the apparatus of FIG. 2.

Like the one shown in FIG. 3, the cooling means of the molding drum 1 consists of a cooling water passage 24 formed on the outer surface of the drum body. The cooling water is introduced into said passage from an intake 23 through the axle of the drum 1 and discharged outside at the other end of the drum 1. Since said cooling means is disposed near the bottom of each embossing recess, embossed portion of the first film and the laminated portion of both first and second films can be effectively cooled. On the outer periphery of the molding drum 1 is fitted a compression chamber 6 provided with a compressed air pipe B containing a heater A. Said compression chamber 6 involves heating means 7 arranged along the outer periphery of the drum 1. There are also disposed in said compression chamber 6 reflecting boards 8 and 8a which have a curved plane for effective utilization of the energy of heat applied.

There will now be described a form of air sealing mechanism of said compression chamber 6. Since said compression chamber 6 which is provided with two rollers 9 and 10 at its film inlet and outlet respectively is pressed tight to the outer periphery of the drum 1, the interstice defined by said periphery with said chamber is fully sealed. Further, a seal board 11 contacts the outer periphery of said rollers 9 and 10 to seal the interstice between said rollers 9 and 10 and compression chamber 6. There is also disposed a casing 12 around said compression chamber 6. Both edge portions of said casing 12 contact the peripheral surface of rollers 9 and 10 and the end face of ring 2 to prevent air from leaking out of said compression chamber 6.

Embossment by the subject apparatus is carried out with an extremely low air pressure of 20 to 300 mm. H₂O, eliminating the necessity of using a complicated mechanism to seal up air in the compression chamber, so that air seal can be easily effected by any known means.

On the outer periphery of the rotating drum 1 there are provided a water-coolable roller 13 for feeding a second film to said drum 1 to be attached to a first embossed film and a laminating chamber 15 containing heating means 14, the elements of which are arranged in the same manner as those used in said compression chamber 6. The first embossed film and second film bonded therewith are pressed together by a water-coolable nip roller 16 to form cushioning material. Said film assembly is cooled while travelling between said nip roller 16 and a water-coolable discharge roller 17 and taken up as a product on a reel (not shown) from the ring 2 by said discharge roller 17.

According to the aforementioned arrangement, an already formed first film 18 made of thermoplastic material is supplied while being clamped between the molding drum 1 rotating in a direction indicated by the arrow of FIG. 1 and roller 9. Said film 18 is thermally plasticized in said compression chamber 6 and forced into molding recess with air pressure for embossment. If, in this case, the air to be introduced is heated in advance, embossment can be made quickly to that extent. An embossed film leaving said compression chamber 6 and a separately supplied second film 19 are introduced into said laminating chamber 15 in a state superposed with pressure by said roller 13. Both films are thermally plasticized in said laminating chamber 15 and formed into cushioning material by being pressed with said nip roller 16. This cushioning material is cooled while travelling between said nip roller 16 and discharge roller 17 and taken up as a product 20 by means of said discharge roller 17. For full cooling, there may be blown air to the surface of said cushioning material while it is carried between said rollers 16 and 17.

The apparatus of the present invention arranged as described above has excellent characteristics, for example, that use of an already formed film in preparing cushioning material simplifies the manufacturing process, the double construction of a molding rotating drum allows the shape and size of embossments to be easily changed by replacement of an engaging ring 2, all the rollers which are water-coolable prevent a film from being wound about the drum 1, and the heating of the film on the surface of the drum 1 saves it from being contracted in its transverse direction. Further advantages are that the embossment and lamination of films are conducted while they are heated, thereby reducing heat loss and the sealing of air in a compression chamber minimizes air requirements for embossment and prevents embossment from being effected irregularly.

The compression chamber 6 is so arranged as to seal up air with its casing 12 pressed to the peripheral surface of the water-coolable rollers 9 and 10 and the end face of rotating drum 1. However, when the recessed portions of an embossed film pass under the roller 10, the air of said compression chamber 6 tends to escape outside through said recesses. Said air leakage becomes more prominent as said embossment recesses arearranged at a smaller interval.

Figure 2:
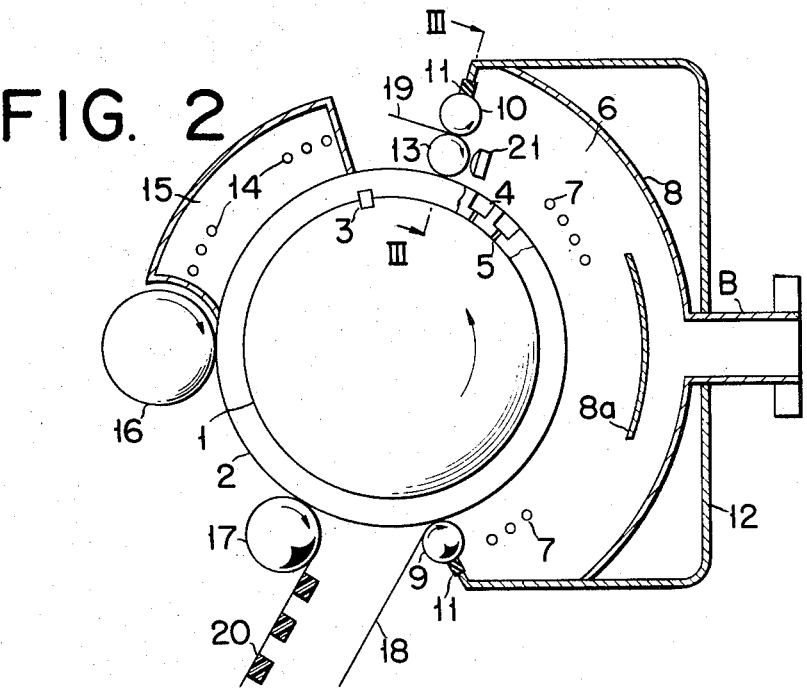
FIG. 2 is a cross sectional view of said apparatus according to another embodiment of the invention.

There will now be described by reference to FIGS. 2 and 3 an improved method and apparatus free from the aforementioned shortcomings which can always seal up air in said compression chamber, prepared cushioning material bearing embossments having a uniform shape and size. Throughout these figures, numeral 1 denotes a water-coolable molding rotating drum. As in FIG. 1, there is detachably fitted a ring 2 to the outer periphery of said drum 1. In said ring 2 are spatially arranged molding recesses 4 of a desired shape and size. When a first film 18 is supplied to the outer surface of the rotating drum 1 through a water-coolable roller 9, it is thermally plasticized by heating means positioned in said compression chamber 6 and forced into said molding recesses 4 with compressed air introduced through a pipe B to be embossed. Separately, there is supplied a second film 19 through the contact plane defined by the water-coolable guide roller 13 with the roller 10 to be superposed on said first embossed film 18. Both films 18 and 19 are conducted in a direction indicated by the arrow to the laminating chamber 15 by the rotation of the drum 1 to be heated by heating means 14 disposed in said laminating chamber 15 and, upon leaving it, laminated with each other by the nip roller 16 and taken out as a product 20 by the discharge roller 17.

The compression chamber 6 is surrounded by the casing 12. The lower edge portions 12a (FIG. 3) on both sides of said casing 12 are made to slide over the end face of said rotating drum 1. To the surface of the rollers 9 and 10 is tightly attached the elastic seal board 11 made of, for example, heat-resistant rubber. Particularly at the film outlet of said compression chamber 6 are juxtaposed the guide roller 13 and water-coolable roller 10. To the contact plane of both rollers 13 and 10 is supplied the second film 19 to be superposed on the first embossed film 18 in a manner to cover the openings of embossments formed on said first film 18, thereby eliminating the occurrence of any gap between said guide roller 13 and recesses of embossments and in consequence preventing air from escaping through said recesses.

Since the compression chamber 6 involves heating means, the first embossed film 18 is already heated to a considerable temperature when said second film is superposed thereon. Accordingly, both films 18 and 19 are preliminarily bonded at this time and saved from creases which might otherwise occur in their lamination. Further it is possible to provide a heater 21 (FIG. 2) in front of the guide roller 13 and heat the superposed films 18 and 19, thereby effectng their full lamination at this stage.

Numerals 8 and 8a are heat reflectors disposed in said compression chamber 6 as described above. Said reflectors 8 and 8a help heat generated by the heating means of the compression chamber 6 to be more effectively applied to said first film introduced.

The apparatus according to the aforementioned embodiment prominently reduces air leakage from the compression chamber 6 and allows embossment to be conducted at a constant pressure and in consequence uniform embossments to be formed on a film, thus producing cushioning material presenting very few creases.

Figure 4:
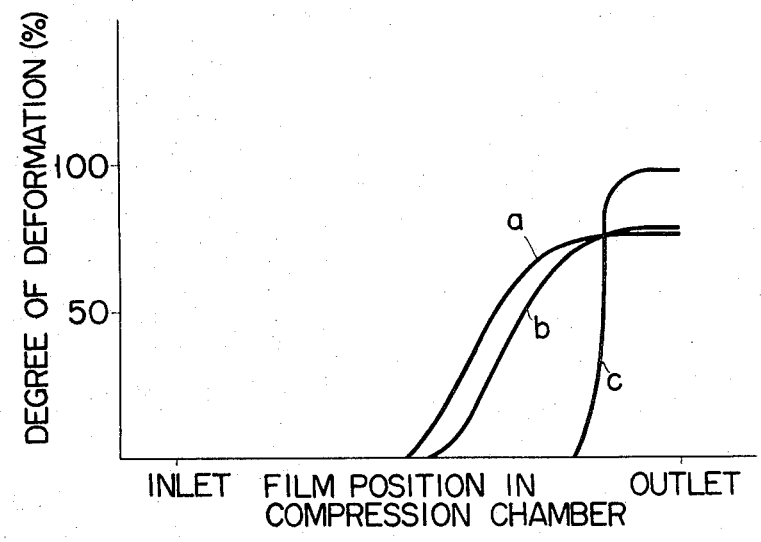
FIG. 4 is a curve diagram showing the mechanism whereby the film is deformed.

With the method and apparatus according to the foregoing embodiment, however, a film introduced into the compression chamber is heated while being subjected to a fixed pressure $P_1$ (hereinafter construed to mean the balance arrived at by subtracting an atmospheric pressure from an absolute pressure). The moment the film is heated up to a level $T_1$ allowing thermal deformation corresponding to said pressure $P_1$, it begins to be deformed. Said pressure $P_1$ is generally of a relatively low order such as 20 to 300 mm. $H_2O$ and in addition the temperature $T_1$ of thermal deformation is low, thus slowing down the speed of deformation. During said deformation process, therefore, the film attaches itself to the side walls and bottom of the molding recesses to be unnecessarily cooled with the resultant decrease in heat conduction by radiation per unit area. For this reason, the deformation of the film is brought to an end, before it is fully embossed, so that such embossment fails exactly to follow the shape of recesses cut out in the molding drum. This event will be apparent from the curve $a$ of FIG. 4. While application of different degrees of pressure varies the position of the film within said compression chamber where it starts deformation, the degree of said deformation little changes (see curve $b$ of FIG. 4). If, for resolution of the aforementioned difficulties, the film is kept in a state free from deformation until it is heated over said temperature $T_1$ and subjected to pressure after it is fully softened by heat, then deformation will take place at an accelerated speed to a full extent as illustrated by the curve C of FIG. 4.

There will now be described the method of the present invention based on the above-mentioned principle which consists in dividing the compression chamber into two zones, maintaining a first zone at a pressure $P_3$ lower than said pressure $P_1$, applying only heating to a first film to raise its temperature to a fully high level, while taking care to prevent its deformation and causing said first film thus fully heated to be rapidly deformed for molding with a pressure $P_1$ in the second zone. Where the compression chamber is partitioned into two zones as described above, use of a roller contacting the film as a partitioning means is not desirable, because it causes the film to be cooled or taken up thereon.

Therefore, it is necessary to separate said compression chamber using a partitioning material which need not be contacted by the film.

Figure 5:
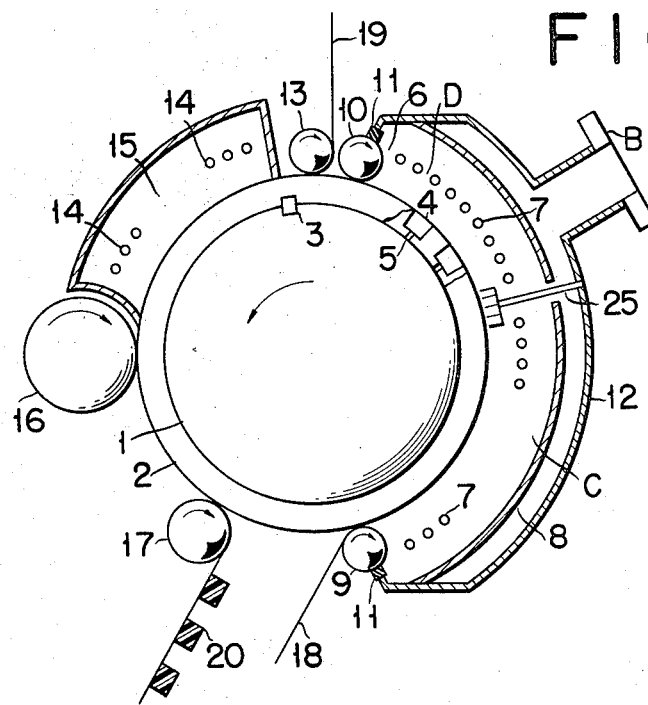

There will now be described by reference to FIGS. 5 and 6 the method and apparatus according to the embodiments intended to attain the aforesaid object. Referring first to FIG. 5, there is supplied a first film 18 made of thermoplastic material to the peripheral surface of the molding rotating drum 1 to which is fitted the ring 2 bearing molding recesses 4 for forming embossments on said first film 18. Said film 18 is brought into the first zone C of said compression chamber 6 by the water-coolable roller 9 and fully heated by a heating means 7, for example, an infrared-ray heater. Since there prevails a low pressure in said first zone C, the film does not start deformation, but is conducted to a second zone D through a partition wall 25 in a fully softened state and embossed with the pressure of air introduced through the pipe B. Said partition wall 25 has a labyrinthian construction at the end which serves to decrease a pressure applied from the second zone D and maintain the pressure of the first zone C at a low level.

Figure 6:
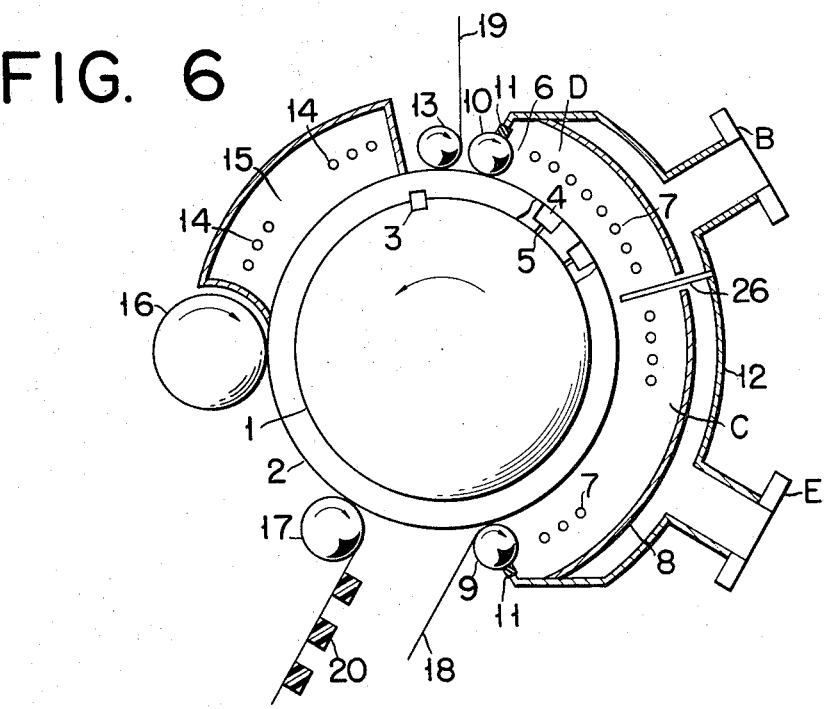

The embodiment of FIG. 6 involves a partition wall 26 which can be so moved as to adjust the interval which it defined with the introduced film. Said partition wall 26 allows air in the first zone C to be sucked out through an exhaust port E and the pressure in the first zone C to be maintained at a lower level than that of the second zone D by applying air pressure through the pipe B.

According to another modification of the embodiments shown in FIGS. 5 and 6 which manufactures a cushioning film assembly by dividing said compression chamber into two zones but lacks said partition wall, the first zone has a special pressurizing means disposed at the end (open to the atmosphere) of the air exhausting means of the molding rotating drum to apply only to the inside of the first film through said air exhausting means a pressure substantially equal to the pressure prevailing within said compression chamber so as to substantially balance the pressures applied to both outside and inside of a film. The film is fully heated with its deformation prevented, and the moment the film is conducted to the second zone, pressure is applied only to its outside to cause it to be rapidly deformed. The pressure used by said special pressurizing means may be obtained by connecting said means to said compression chamber or a separate pressure generator.

There will now be described by reference to FIGS. 7 to 9 the method and apparatus according to the embodiment intended to attain the aforementioned object. Throughout the figures, numeral 27 is a pressurizing means for applying pressure to the inside of a film introduced, said means being connected to a suitable pressure generator (not shown). When a first film 18 made of thermoplastic material enters the first zone C of said compression chamber 6, the outside of said first film is subjected to the pressure of air introduced through the pipe B and then its inside is subjected to a pressure substantially equal to the first mentioned pressure by said pressurizing means 27 through a duct 22 disposed on the peripheral surface of the drum 1 so as to balance the pressures applied to both planes. After said first film 18 is fully heated, it is brought to the second zone D of said compression chamber 6 where there is not disposed said special presusrizing means 27. At this time, pressure is applied only to the outside of said first film 18 for its embossment. In this case, air in the recesses 4 is drawn out through the narrow bores 5 and air exhausting duct 22. Numeral 28 is a seal member 28 (FIG. 8) disposed on the side wall of said compression chamber 6, which is formed of a soft material such as felt, and made to slide over the surface of the ring 2 of the drum 1. The aforesaid pressurizing means 27 is so constructed as to be movable anywhere on the peripheral wall of said drum 1. It is advisable to prepare that part of said compression chamber 6 allows pressure to be ripheral wall of said drum 1 from a soft material such as a highly finished soft metal plate or felt. Numeral 24 is a cooling water passage provided on the drum 1 as described above.

FIGS. 10, 11 and 12 jointly represent another pressurizing means for applying pressure to both outside and inside of a film. Said means is specially devised with respect to the air exhausting means formed on the surface of said drum body and the construction of said compression chamber. Namely, the former half section of said compression chamber 6 allows pressure to be applied to both outside and inside of the first film 18.

As shown in FIGS. 10 and 11, the seal member 29 of said former half section is so disposed as not to close the bores 5a formed on the surface of said drum 1 in order to allow said compression chamber 6 to communicate with said air exhausting duct 22, but to close the outlet 22a of said duct 22. Accordingly, pressure is applied not only to the outside of said first film 18, but also to its inside through said bores 5a, duct 22 and bores 5. Since the presusres applied to both outside and inside of said first film 18 are balanced, full heating is conducted without causing the deformation of said film 18.

When said first film 18 travels to the latter half section of said compression chamber, the bores 5a are closed, as shown in FIGS. 10 and 12, by said seal member 29 and the outlet 22a of said air exhausting duct 22 is opened, causing pressure to be applied only to the outside of said first film 18 and not to the inside thereof and in consequence said film 18 to be embossed.

What we claim is:

1. A method of manufacturing cushioning material which comprises:
   (A) feeding in a first zone a first film of thermoplastic material to the surface of a molding drum having a plurality of vented molding recesses formed therein with cooling means disposed near the bottom of said recesses,
   (B) heating said film on said drum surface and in said first zone applying compressed air to the heated external surface of the film, the pressure of said air being insufficient to deform the film into said recesses,
   (C) moving said film by rotation of said drum to a second zone and while said film is heated applying compressed air to the heated external surface of the film in said second zone, the pressure of said air in the second zone being sufficiently great to deform the film into said recesses in said drum and produce an embossed film,
   (D) feeding a second film made of thermoplastic material toward the surface of said molding drum to be superposed on said embossed film,
   (E) heating said second film to a temperature over its softening point,
   (F) integrally joining both said films together while the temperature of both films is at a level higher than their softening points so that said second film closes the opening of embossments in said first film to hermetically seal said embossments,
   (G) cooling the resulting integrally bonded film assembly while it is supported on said molding drum, and thereafter,
   (H) removing the cooled film assembly from said molding drum.

2. A method of manufacturing cushioning material which comprises:
   (A) feeding in a first zone a first film of thermoplastic material to the surface of a molding drum having a plurality of molding recesses formed therein with cooling means disposed near the bottom of said recesses,
   (B) heating said film on said drum surface and in said first zone applying compressed air to both surfaces of said heated film, the pressure of the compressed air being substantially equal on both surfaces of the film,
   (C) moving said film by rotation of said drum to a second zone and while said film is heated applying compressed air to the surface only external of said drum, the pressure of said compressed air in the second zone being sufficiently great to deform the film into said recesses in said drum and produce an embossed film,
   (D) feeding a second film made of thermoplastic material toward the surface of said molding drum to be superposed on said embossed film,
   (E) heating said second film to a temperature over its softening point,
   (F) integrally joining both said films together while the temperature of both films is at a level higher than their softening points so that said second film closes the opening of embossments in said first film to hermetically seal said embossments,
   (G) cooling the resulting integrally bonded film assembly while it is supported on said molding drum, and thereafter,
   (H) removing the cooled film assembly from said molding drum.

References Cited

UNITED STATES PATENTS

| | | | |
|---|---|---|---|
| 3,416,984 | 12/1968 | Chavannes et al. | 156—209 |
| 3,142,599 | 7/1964 | Chavannes | 156—210 |

DOUGLAS J. DRUMMOND, Primary Examiner

H. F. EPSTEIN, Assistant Examiner

U.S. Cl. X.R.

156—285